United States Patent
Hebert et al.

(10) Patent No.: US 9,894,090 B2
(45) Date of Patent: Feb. 13, 2018

(54) PENETRATION TEST ATTACK TREE GENERATOR

(71) Applicant: SAP SE, Walldorf (DE)

(72) Inventors: Cedric Hebert, Mougins (FR); Laurent Gomez, Pegomas (FR)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 14/799,176

(22) Filed: Jul. 14, 2015

(65) Prior Publication Data
US 2017/0019421 A1   Jan. 19, 2017

(51) Int. Cl.
| H04L 29/06 | (2006.01) |
| G06F 17/30 | (2006.01) |
| G06F 21/55 | (2013.01) |
| G06F 21/57 | (2013.01) |

(52) U.S. Cl.
CPC .... *H04L 63/1433* (2013.01); *G06F 17/30327* (2013.01); *G06F 17/30377* (2013.01); *G06F 21/552* (2013.01); *G06F 21/577* (2013.01); *H04L 63/1408* (2013.01)

(58) Field of Classification Search
None
See application file for complete search history.

(56) References Cited

U.S. PATENT DOCUMENTS

| 5,850,516 | A  | 12/1998 | Schneier |
| 6,952,779 | B1 | 10/2005 | Cohen et al. |
| 7,013,395 | B1 |  3/2006 | Swiler et al. |
| 7,194,769 | B2 |  3/2007 | Lippmann et al. |
| 7,272,716 | B2 |  9/2007 | Haller et al. |
| 7,386,785 | B2 |  6/2008 | Ulmer et al. |
| 7,587,676 | B2 |  9/2009 | Gomez et al. |
| 7,627,900 | B1 | 12/2009 | Noel et al. |
| 7,673,141 | B2 |  3/2010 | Kilian-Kehr et al. |

(Continued)

FOREIGN PATENT DOCUMENTS

CN    102546639    7/2012

OTHER PUBLICATIONS

Authors: Arkin, Stender, McGraw; "Software penetration testing"; Publisher: IEEE Security & Privacy; Date: Jan./Feb. 2005; pp. 84-87.*

(Continued)

*Primary Examiner* — Hadi S Armouche
*Assistant Examiner* — Andrew J Steinle
(74) *Attorney, Agent, or Firm* — Fish & Richardson P.C.

(57) ABSTRACT

Implementations of the present disclosure include methods, systems, and computer-readable storage mediums for receiving goal data and start-up information, the goal data indicating a goal to be achieved during a penetration test, the start-up information indicating initial data for beginning the penetration test, receiving tool data from a register of tools, the tool data including one or more tools that can be used during the penetration test, and, for each tool, input data required to execute the tool and output data provided by the tool, processing the goal data, the start-up information and the tool data to automatically generate attack tree data, the attack tree data including a plurality of data sets and links between data sets, and providing the attack tree data to display a graphical representation of an attack tree on a display.

20 Claims, 6 Drawing Sheets

(56) References Cited

U.S. PATENT DOCUMENTS

| | | | |
|---|---|---|---|
| 7,685,536 | B2 | 3/2010 | Hebert et al. |
| 7,904,962 | B1 | 3/2011 | Jajodia et al. |
| 7,945,044 | B2 | 5/2011 | Sorniotti et al. |
| 7,971,252 | B2 | 6/2011 | Lippmann et al. |
| 8,156,537 | B2 | 4/2012 | Gomez et al. |
| 8,392,997 | B2 | 3/2013 | Chen et al. |
| 8,468,598 | B2 | 6/2013 | Hebert |
| 8,473,962 | B2 | 6/2013 | Hebert et al. |
| 8,490,154 | B2 | 7/2013 | Gomez et al. |
| 8,490,196 | B2 | 7/2013 | Lucangeli Obes et al. |
| 8,539,599 | B2 | 9/2013 | Gomez et al. |
| 8,548,627 | B2 | 10/2013 | Ulmer et al. |
| 8,687,805 | B2 | 4/2014 | Gomez |
| 8,726,395 | B2 | 5/2014 | Gomez et al. |
| 8,744,892 | B2 | 6/2014 | Reznichenko et al. |
| 8,775,127 | B2 | 7/2014 | Gomez et al. |
| 8,813,234 | B1 | 8/2014 | Bowers et al. |
| 8,819,131 | B2 | 8/2014 | Hebert et al. |
| 8,918,884 | B2 * | 12/2014 | Jajodia .................. G06F 21/577 709/223 |
| 8,925,080 | B2 | 12/2014 | Hebert |
| 9,047,490 | B2 | 6/2015 | Montagut et al. |
| 2006/0021048 | A1 | 1/2006 | Cook et al. |
| 2006/0168062 | A1 | 7/2006 | Hebert et al. |
| 2007/0061589 | A1 | 3/2007 | Ulmer et al. |
| 2007/0101008 | A1 | 5/2007 | Gomez |
| 2007/0143403 | A1 | 6/2007 | Ulmer et al. |
| 2007/0180036 | A1 | 8/2007 | Hebert et al. |
| 2008/0077933 | A1 | 3/2008 | Montagut et al. |
| 2008/0098479 | A1 * | 4/2008 | O'Rourke ........... H04L 63/1433 726/25 |
| 2008/0184334 | A1 | 7/2008 | Hebert et al. |
| 2009/0327317 | A1 | 12/2009 | Ulmer et al. |
| 2010/0192195 | A1 * | 7/2010 | Dunagan ............... G06F 21/577 726/1 |
| 2011/0061104 | A1 * | 3/2011 | Sarraute Yamada ....................... H04L 41/0823 726/23 |
| 2012/0042364 | A1 | 2/2012 | Hebert |
| 2013/0055404 | A1 | 2/2013 | Khalili |
| 2013/0262397 | A1 | 10/2013 | Hebert |
| 2013/0305312 | A1 | 11/2013 | Gomez et al. |
| 2014/0104668 | A1 | 3/2014 | Gomez |
| 2015/0007330 | A1 | 1/2015 | Gomez |
| 2015/0261958 | A1 * | 9/2015 | Hale .................... G06F 21/577 726/25 |
| 2016/0205122 | A1 * | 7/2016 | Bassett ................. G06F 21/577 726/23 |

OTHER PUBLICATIONS

S. Jha, O. Sheyner, J. Wing, "Two Formal Analyses of Attack Graphs"; Proceeding CSFW '02 Proceedings of the 15th IEEE workshop on Computer Security Foundations; Jun. 24-26, 2002; 15 pages; ISBN: 0-7695-1689-0.

*What is Secur/Tree?*; Amenaza Technologies Limited; Attack Tree Modeling; located on the web at: http://www.amenaza.com/SS-what_is.php; Jan. 21, 2015.

\* cited by examiner

PENETRATION TEST ATTACK TREE GENERATOR

BACKGROUND

Network-based systems and applications are susceptible to attacks by malicious users (e.g., hackers). Penetration testing (also referred to as pentesting) is conducted to attack systems and applications in an effort to find security holes, which can be exploited by malicious users. In general, penetration testing simulates attacks malicious users could attempt. During penetration testing, a series of tasks is performed in an effort to achieve a goal. A task can be performed using a respective tool (e.g., provided as one or more computer-executable programs), a subset of a tool, and/or by the tester writing a custom tool. Consequently, executing a penetration test can include running a set of tools in a specified order and, based on their outcomes, run further testing tools until a goal is reached, or failure occurs.

Attack trees are diagrams depicting how an asset might be attacked. Attack trees can be used in penetration testing as an efficient way to make the testing transparent and repeatable. During the course of a penetration test, an initial attack tree can be altered to account for other attack paths not provided for in the initial attack tree. Generating attack trees for specific systems can be inefficient and time consuming, and the quality of the attack tree can vary. In some cases, attack trees are manually generated by system experts (e.g., users knowledgeable about system details). In general, the quality of the attack tree is as good as the quality of the user, who manually models the system.

SUMMARY

Implementations of the present disclosure include computer-implemented methods for automatically generating an attack tree that can be used in penetration testing of a target system. In some implementations, methods include actions of receiving goal data and start-up information, the goal data indicating a goal to be achieved during a penetration test, the start-up information indicating initial data for beginning the penetration test, receiving tool data from a register of tools, the tool data including one or more tools that can be used during the penetration test, and, for each tool, input data required to execute the tool and output data provided by the tool, processing the goal data, the start-up information and the tool data to automatically generate attack tree data, the attack tree data including a plurality of data sets and links between data sets, and providing the attack tree data to display a graphical representation of an attack tree on a display.

These and other implementations can each optionally include one or more of the following features: processing the goal data, the start-up information and the tool data to automatically generate attack tree data includes: reading a data element from a pool of data elements, comparing the data element to one or more output data of at least one tool in the register of tools, and selectively instantiating data based on the comparing; comparing the data element to one or more output data of at least one tool in the register of tools is executed in response to determining that the data element is not included in the start-up information; selectively instantiating data based on the comparing includes determining that the data element matches an output data of a tool, and in response, populating one or more parameters of the tool with respective template elements to provide an executable command, the respective template elements being subsequently instantiated; selectively instantiating data based on the comparing further includes adding one or more input data of the tool to the pool of data elements; the attack tree includes a combination of two or more attack vectors for attacking the target system; and actions further include determining that a data set of the attack tree data cannot be bound to the start-up data, and in response, deleting the data set from the attack tree data.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to automatically generating an attack tree that can be used in penetration testing of a target system. More particularly, implementations of the present disclosure are directed to processing goal data, start-up information and tool data to automatically generate attack tree data, the attack tree data including a plurality of data sets and links between data sets. In some examples, the attack tree data is provided to display a graphical representation of an attack tree on a display.

In general, and as described in further detail herein, implementations of the present disclosure account for capabilities of tools used during penetration testing, and automatically binds tools to the attack tree. In this manner, implementations of the present disclosure enable a tester to define the asset that is to be exploited, and a relevant initial attack tree is automatically provided. In some examples, implementations of the present disclosure enable non-expert testers to follow the paths offered by the attack tree in order to conduct security testing (pentesting). In some implementations, expert testers can enhance an attack tree database with their own attack paths, updating the capabilities of one or more tools for the subsequent tests. Implementations of the present disclosure further provide semi-automated pentest execution.

Figure 1:
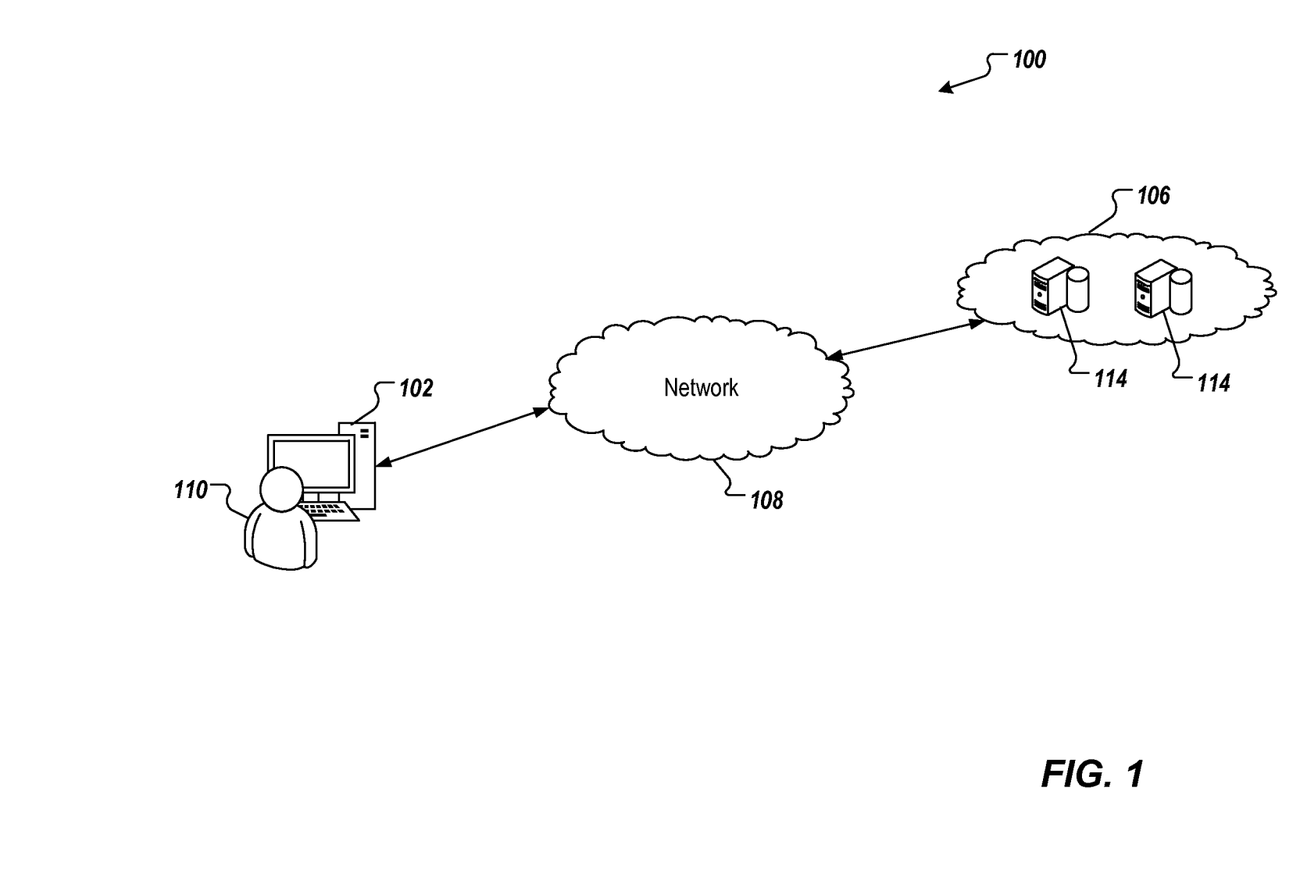
FIG. 1 depicts an example system in accordance with implementations of the present disclosure.

FIG. 1 depicts an example system 100 in accordance with implementations of the present disclosure. The example system 100 can be used to automatically generate an attack tree, as described herein. In the depicted example, the example system 100 includes a computing device 102, a back-end system 106, and a network 108. In some examples, the communication device 102 is operated by a user 110. An example user can include a tester that performs penetration testing on a target system. In the depicted example, the computing device 102 is provided as a desktop computer. It is contemplated, however, that implementations of the present disclosure can be realized with any appropriate computing device (e.g., smartphone, tablet computing device, laptop computer, desktop computer). In some examples, the network 108 includes a local area network (LAN), wide area network (WAN), the Internet, or a combination thereof, and connects web sites, user devices (e.g., the computing device 102), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 114. In some examples, the at least one server system 114 hosts one or more computer-implemented services that users can interact with using computing devices. For example, the computing device 102 can be used to communicate with a service hosted by the back-end system 106 over the network 108. In some examples, the computing device 102 includes a computer-executable application executed thereon, which can be used to log into the service and establish a communication session between the computing device 102 and the back-end system 106. For example, the computing device 102 includes a web browser application executed thereon, which can be used to display one or more web pages of the service, the user interacting with the service through the web page(s). In some examples, the computing device 102 can execute a mobile application (mobile app) to access the back-end system 106.

As introduced above, implementations of the present disclosure are generally directed to automatically generating an attack tree that can be used in penetration testing of a target system. In some examples, a penetration test has one or more initial goals (e.g., obtain administrative privileges on a target machine, retrieve information from a protected database). In some examples, an attack tree is to be provided for each goal. Consequently, a penetration test having multiple goals can require multiple attack trees to be provided.

An example goal can include obtaining administrative privileges on machine X, which can be performed by more than one attack chain. In some examples, an attack chain includes a chain of tasks that can be performed, using respective tools, to achieve the goal. Example attack chains are discussed in the example scenarios, Scenario 1 and Scenario 2, described in detail below. Each scenario includes a list of example tasks that could be performed in an effort to achieve the goal.

Scenario 1
1→discover a server message block (SMB) server on machine Y;
2→brute-force the password of the user 'samba' for this service;
3→connect to the SMB service with the found credentials;
4→fingerprint the SMB server and discover the name and version of the program running behind it;
5→run an appropriate exploit for this SMB server program and version, allowing access to the full disk of machine Y;
6→discover on the disk a configuration file with credentials (username and password) for machine X;
7→fingerprint the machine X and discover its operating system name and version;
8→connect to machine X with found credentials;
9→run an appropriate privilege escalation exploit for this system, promoting the user to an administrator; and
10→using administrator privileges, create a backdoor administrator user (reaching the goal).

Scenario 2
1→discover a hypertext transfer protocol (HTTP) server on machine X;
2→discover a list of web applications on the server through forced browsing;
3→identify that one of these web applications is vulnerable to cross-site scripting;
4→setup a malicious server waiting for connection to the vulnerable web application and through the cross-site scripting to steal the session cookie of anyone visiting the page;
5→through session fixation, impersonate connecting users until finding one which has privileges to upload and run arbitrary files;
6→upload a backdoor program and execute it, spawning a shell on the attacker's machine;
7→through the shell, escalate privileges to administrator privileges; and
8→with the administrator privileges, create a backdoor administrator user (reaching the goal).

Both scenarios are examples of attack chains. A successful penetration test will rapidly grow into very complex attack trees. Each of the steps of Scenario 1 and Scenario 2 is achieved using tools (e.g., computer-executable programs). Accordingly, the example scenarios can be rewritten as follows, to account for tools used:

Scenario 1
1→discover a SMB server on machine Y
    nmap -p 443 yyy.yyy.yyy.yyy
2→brute-force the password of the user 'samba' for this service
    hydra smb://yyy.yyy.yyy.yyy -l samba -P passwordlist
3→connect to the SMB service with the found credentials
    smbclient yyy.yyy.yyy.yyy -u samba -p letmein
4→fingerprint the SMB server and discover the name and version of the program running behind it
    nmap -p 443 -sV yyy.yyy.yyy.yyy
5→run an appropriate exploit for this SMB server program and version, allowing access to the full disk of machine Y
    msfconsole -r samba_symlink_traversal.rc 6→discover on the disk a configuration file with credentials (username and password) for machine X
    find . -name *.ini | grep *pass*
7→fingerprint the machine and discover its operating system name and version
    nmap -O xxx.xxx.xxx.xxx
8→connect to machine X with found credentials
    rdesktop xxx.xxx.xxx.xxx -u alice -p sekr3t
9→run an appropriate privilege escalation exploit for this system, promoting the user to an administrator
    getsystem
10→with the administrator privileges, create a backdoor administrator user
    net user backdoor backdoor /add
    net localgroup administrators backdoor /add
Scenario 2
1→discover an HTTP server on machine X:
    nmap -p 80 xxx.xxx.xxx.xxx
2→discover a list of web applications on the server through forced browsing:
    dirb http://xxx.xxx.xxx.xxx:80 wordlist
3→identify that one of these web applications is vulnerable to cross-site scripting:
    searchsploit opendocman 1.2.5 | grep xss
4→setup a malicious server waiting for connection to the vulnerable web application and through the cross-site scripting to steal the session cookie of anyone visiting the page:
    searchsploit opendocman 1.2.5 | grep xss
5→through session fixation, impersonate connecting users until finding one which has privileges to upload and run arbitrary files:
    iceweasel http://xxx.xxx.xxx.xxx/opendocman/login/
6→upload a backdoor program and execute it, spawning a shell on the attacker's machine:
    curl -F "user-id=1" -F "filecomment=This is not an exploit" -F
    binfile=@/home/eviluser/exploit.exe
    xxx.xxx.xxx.xxx/opendocman/uploader/php
    wget -F "binary=exploit.exe" http://xxx.xxx.xxx.xxx/cgi-bin/execsh
7→through the shell, escalate privileges to administrator privileges:
    getsystem
8→with the administrator privileges, create a backdoor administrator user (reaching the goal):
    net user backdoor backdoor /add
    net localgroup administrators backdoor /add Among others identified above, example tools include Nmap ('Network Mapper,' a tool for network discovery and security auditing), Hydra (a password cracking tool), smbclient (a tool for accessing resources on servers), Msfconsole (an interface for accessing functionality of the Metasploit Framework (MSF)), rdesktop (a remote desktop protocol client), getsystem (a sub-script of a tool used in attempts to gain system-level privileges), and Dirb (a web content scanner). In some examples, each tool requires particular input data (IN DATA) and provides output data (OUT DATA). In some implementations, a register of tools is provided and includes a list of available tools (e.g., tools available for pentesting), as well as the respective input data required for each tool and output data provided by each tool. In some examples, the register is provided as a computer-readable document saved in computer-readable memory.

It is contemplated that the example tools, as well as other tools not specifically identified herein can be used for achieving the same result. In some examples, one or more steps require interacting with an application through a user interface (UI) and cannot easily be launched through the command line. However, and as described in further detail herein, the above-described example scenarios highlight the underlying issues addressed by implementations of the present disclosure. Accordingly, each node of the attack tree is considered as a specific command—a tool name, a command line with parameters, or a list of practical actions to perform—along with a list of required inputs, and a list of potential outputs. In some implementations, a merged attack tree can be provided that addresses multiple attach chains.

Figure 2A:
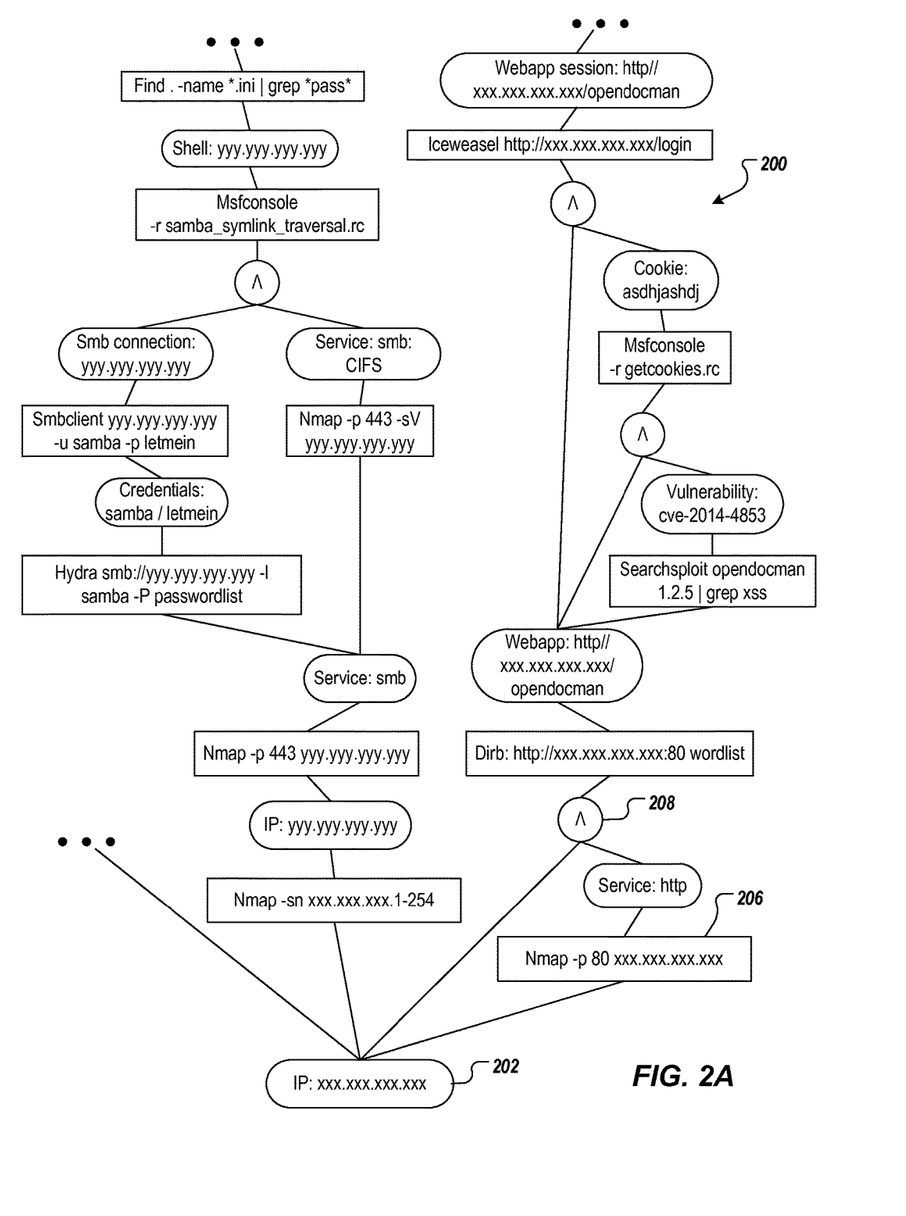
FIGS. 2A and 2B depict respective portions of an example attack tree.
Figure 2B:
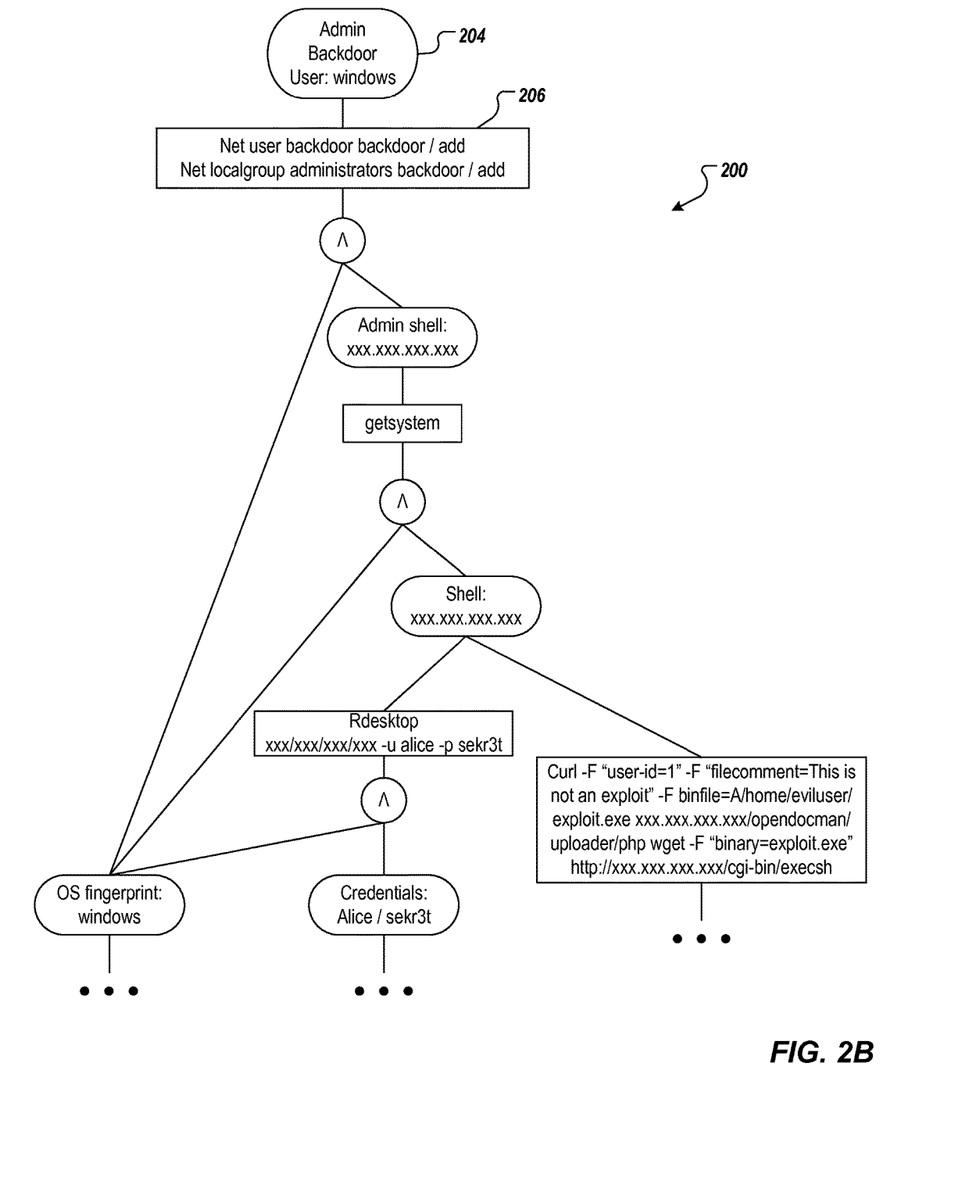

FIGS. 2A and 2B depict respective portions of an example attack tree 200. The example attack tree 200 is based on the example goal of: using start-up information that the target machine's Internet Protocol (IP) address is xxx.xxx.xxx.xxx (FIG. 2A: node 202), obtaining a backdoor user with administrative privileges on machine xxx.xxx.xxx.xxx (FIG. 2B: node 204). That is, the node 204 of FIG. 2B is the top node of the example attack tree 200, and represents the goal of the penetration test: to acquire a backdoor admin user on machine xxx.xxx.xxx.xxx. The nodes under the node 202 represent the actions, which can lead to achieving the goal. Respective prerequisite actions 206 are provided, which represent prerequisite actions required to be performed to acquire input data (IN DATA) for an action represented by a subsequent node in the attack tree 200. At the bottom of the attack tree 200, shown in FIG. 2A, lies the initially known information, the IP address of node 202, from which initial tests can be made in order to attempt to acquire the necessary data.

The example attack tree 200 of FIGS. 2A and 2B can be automatically generated in accordance with implementations of the present disclosure. The example attack tree 200 of FIG. 2 is based on Scenario 1 and Scenario 2, described above.

In accordance with implementations of the present disclosure, and as described in further detail herein, an attack tree is automatically generated based on the data output by the actions or input to the actions, and not just the actions alone. In other words, implementations of the present disclosure provide each test (action) that is to be performed along with respective data inputs (IN DATA) and outputs (OUT DATA). In some implementations, chaining of such input and output data enables automatic generation of the attack tree. In some examples, the generated attack tree includes all tests that may be beneficial to achieving the end goal, and excludes tests that would provide out-of-scope information (e.g., information that is not needed to achieve the goal). As an example, a tool such as 'host' can return the DNS name associated to a specified IP address. This information can be useful for exploiting certain types of applications relying on the DNS name, but will not help with respect to the example attack tree 200. Consequently, executing the 'host' command on the known IP address xxx.xxx.xxx.xxx will not be displayed in the generated attack tree.

Implementations of the present disclosure leverage the articulation of tools (or sets of actions to execute) around their requirements (inputs) and possible outputs, acting as the glue between what will become the branches of the attach tree. In some implementations, if a tool requires more than one data element, an 'AND' condition is provided in the attack tree (e.g., AND node 208 of FIG. 2A). If more than one tool can retrieve the same information, both tools point to the related information element in the attack tree. In some implementations, such double pointing is considered as an 'OR' condition and is represented as such in the attack tree.

In some examples, each tool includes the tool itself (e.g., the computer-executable code) and specific parameters, the required input and the generated output. In some examples, each data element, acting as input or as output, is represented as an atomic element (e.g., the elements 206 of the attack tree 200).

In accordance with implementations of the present disclosure, the attack tree is automatically generated by receiving the goal and the startup information, and mapping the goal and startup information to respective data elements. In some implementations, the goal is provided as the root node of the attack tree. In some examples, all tools having this (goal) data element as output are retrieved and form the first tree leaves, along with their own input requirements. In some examples, this is repeated for each added (data) input element, until all of the data elements can be mapped to startup information or until no tool using the data element can be found.

In some implementations, data elements used as input and output are identified in a non-ambiguous way. As an example, a username and password used for logging into a session in MICROSOFT WINDOWS® will be different than a username and password used for connecting to the mysql database present on the same machine. Consequently, these two types of data are described differently in order to be reused properly. Simply describing them as 'username' and 'password' would be too ambiguous. Consequently, implementations of the present disclosure enable data elements to be represented based on the following example data format:

[Network 1][Application 1][Network 2][Application 2][. . . ][Network N][Application N]

In some implementations, the [Network] elements describe the way to reach the application from a remote machine. In some examples, this network vector is used for legitimate access (e.g., connecting to a File Transfer Protocol (FTP) server with one's own credentials) as well as for illegitimate access (e.g., spawning a shell through injection of malicious packets to a vulnerable network service). In some examples, the [Network] part includes the following example structure:

[Physical, Data Link, Network, Transport, Port, Presentation, Application]

In some examples, Physical is the first level in the Open Systems Interconnection (OSI) layer. Examples of Physical elements are, without limitation, workstation, router, hub, and mobile phone. In some examples, the Physical element describes the target, (e.g., the physical machine which is being tested). In some examples, Data Link is the second level in the OSI layer. Examples of Data Link elements are, without limitation, Ethernet, Wifi, and BLUETOOTH®. In some examples, Network is the third level in the OSI layer. Examples of Network elements are, without limitation, IPv4 addresses and IPv6 addresses. In some examples, Transport is the fourth level in the OSI layer. Examples of Transport elements are, without limitation, User Datagram Protovol (UDP), Transmission Control Protocol (TCP), and Internet Control Message Protocol (ICMP). In some examples, Port is the fifth level in the OSI layer (called 'session layer'). Examples of Port elements are, without limitation, 22, and 443. In some examples, Presentation is the sixth level in the OSI layer. Examples of Presentation elements are, without limitation, Wired Equivalent Privacy (WEP), and Wi-Fi Protected Access (WPA). In some examples, Application is the seventh level in the OSI layer. Examples of Application elements are, without limitation, Secure Hypertext Transfer Protocol (HTTPS), SMB, and FTP.

In some implementations, the [Application] elements describe the elements standing on top of the application, which is the upper layer of the network stack. In some examples, these elements describe the way to interact with the application either through legitimate access (such as a user session) or through illegitimate access (such as replaying a stolen hash for authenticating). An example structure of the [Application] part is provided as:

[Program Name, Program Version, Privileges, Path, Session, Username, Password, Hash, Vulnerability, Exploit]

In some examples, Program Name is which program runs on top of the Application layer. Examples of Program elements are, without limitation, Apache, and Filezilla. In some examples, Program Version describe the version of the program (e.g., 12.3a, 1.09). In some examples, Privileges is the level of privileges of the connected user. This can be 'root' for root or administrator accounts and 'unprivileged' for other accounts. This can also be 'sudo' for sudoers, and 'DBA' for database administrators. In some examples, Path is a possible path within the running program. For example, for the program 'cmd.exe' on MICROSOFT WINDOWS®, this can be a specific directory within the file system. For an FTP server, for example, it can be a specific folder. For a web application, for example, this will be a specific uniform resource locator (URL) (e.g., detailing a specific web application such as /opendocman/login.php). In some examples, Session is a possible user session with the program denoted by the path or program (e.g., session cookies). In some examples, Username and Password are credentials for the current program. Depending on the underlying program, these may simply be a password (e.g., Simple Network Management Protocol (SNMP) community strings) without a username. In some examples, Hash is the hash of the password. Certain hashes can be used instead of passwords (in 'pass-the-hash' scenarios) or must first be brute-forced with password crackers before becoming standard passwords. In some examples, Vulnerability is an identified vulnerability for the given context. For example, a Common Vulnerabilities and Exposures (CVE) number or an internal identifier. In some examples, Exploit is an existing (or specifically written) exploit for the given context. For example, a URL to a known exploit or an internal identifier.

In some implementations, each of the elements of the example data structure can be rewritten in a unique way. In some examples, regular expressions can be used for describing the elements, for example, for the elements where any value can be acceptable or for specifying a list of possible values.

Implementations of the present disclosure also include combining network and application elements. In some examples, the Application stack can repeat any number of times, as an application can run on top of another application. For example, a blog server such as Wordpress can run on top of an Apache server and serve several blogs, each of them being managed by a specific user. In this case, the Network element in-between will be marked as empty (e.g. [ ]), denoting the fact that no network communication happens between, for example, the Apache server and the Wordpress server. In other words, and continuing with the example above, the 'stack' [Network 1][Application 1][Network 2][Application 2][. . . ][Network N][Application N] would include [Network 1][Application 1][ ][Application 2], where Network 1 would describe how to reach the Apache server, Application 1 would describe Wordpress and Application 2 would describe a specific blog.

Another example of chaining applications is in the case of 'pivoting,' which is a technique that includes attacking one machine through possibly several other machines, or if tunnels (e.g., Secure Shell (SSH) tunnels) are being used. As discussed above, the stack can be repeated, each time providing the Network and Application elements. For example, [Network 1][Application 1][Network 2][Application 2] could be the notation for accessing a specific file of machine 2 (its path being depicted in Application 2) through its FTP service (Network 2) reached through a command executed on machine 1 (depicted in Application 1) injected through a remote desktop access to machine 1 (depicted by Network 1).

Figure 3:
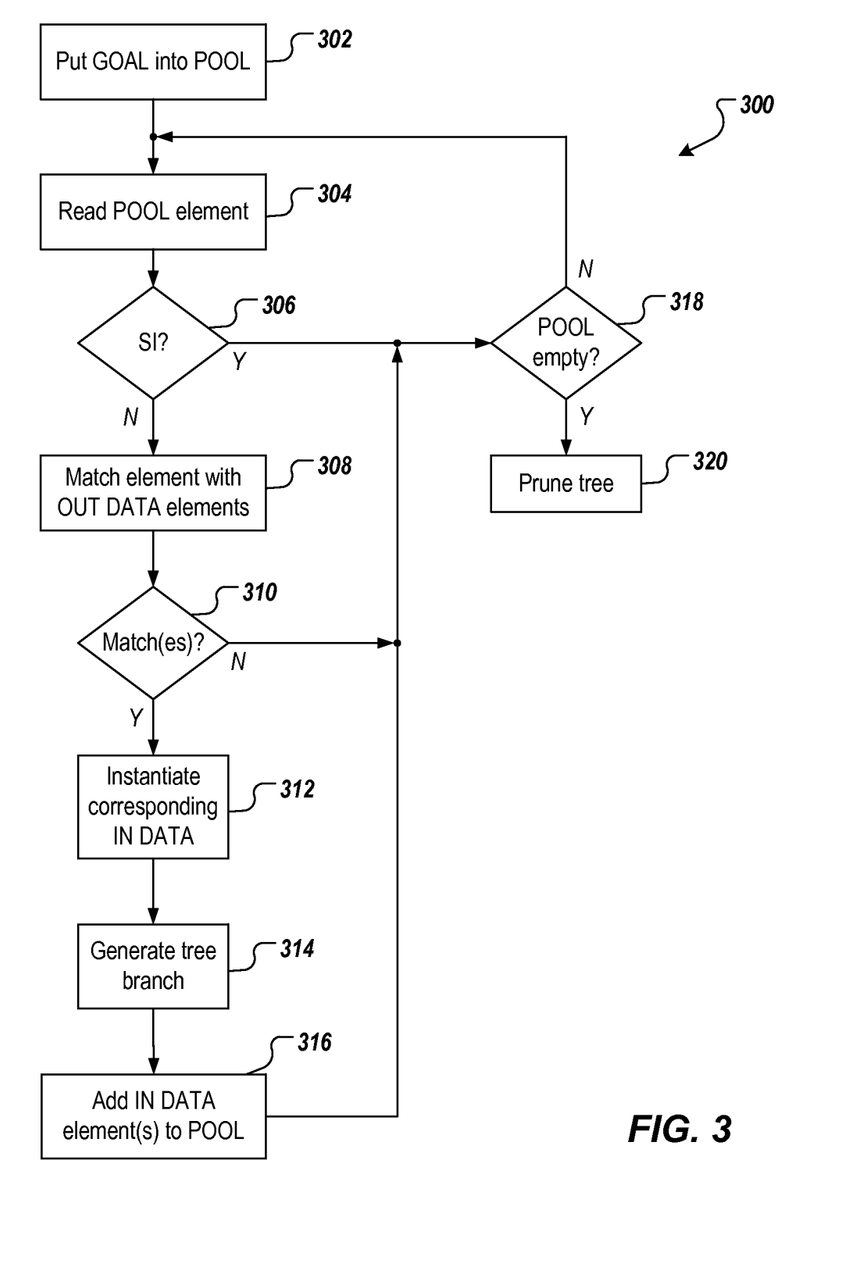
FIG. 3 depicts an example architecture for realizing implementations of the present disclosure.

FIG. 3 depicts an example process 300 that can be executed in accordance with implementations of the present disclosure. In some implementations, the example process 300 can be realized using one or more computer-executable programs executed using one or more computing devices. The example process 300 can be executed to automatically generate an attack tree based on the example data format described herein.

A goal (GOAL) is put into a pool of data elements (POOL) (302). For example, user input can be provided, which defines the GOAL, and, in response to the user input, the GOAL is included in POOL. In some examples, GOAL is represented in the data format described herein. For example, an example goal (described above) includes obtaining a backdoor user with administrative privileges on machine xxx.xxx.xxx.xxx, using the startup information (STARTUP INFORMATION) that the target machine IP address is xxx.xxx.xxx.xxx. Consequently, GOAL can be represented as [„xxx.xxx.xxx.xxx,„,][„root,„<user>, <pass>,„], which can be read as: 'I want a username and a password, which can be anything (username could be set, but presetting a password can be problematic if the password policy rejects one for being too simple or too long), and which has administrative privileges, on the machine having the IP address xxx.xxx.xxx.xxx. After GOAL is input to POOL, POOL can be provided as:

POOL

[„xxx.xxx.xxx.xxx,„,][„root,„<user>,<pass>,„]

An element of POOL is read (304). For example, [„xxx.xxx.xxx.xxx,„,][„root,„<user>,<pass>,„] is read from POOL. It is determined whether the read element is STARTUP INFORMATION (SI) (306). In some examples, a value of the read element is compared to value(s) of the STARTUP INFORMATION, which can be provided as: [„xxx.xxx.xxx.xxx,„,][„,„,„]. Continuing with the example above, the match would fail, because the values 'root,' '<user>' and '<pass>' do not match with an empty value. If the read element is not STARTUP INFORMATION, the read element is matched to an output (OUT DATA) (308). For example, a comparison is made between the value of the read element and the OUT DATA elements of each of the registered tools (e.g., tools provided in a list of registered tools). In some examples, OUT DATA is provided as the output a specific tool is able to generate. Continuing with the example above, a NET USER tool can be provided, which is able to create a user with administrative privileges, as long as it is executed on a Windows machine on which an administrative shell is already provided. In some examples, the NET USER tool can be provided as:

TOOL:
Net user <13><14>/add
Net localgroup Administrators <13>/add
OUT DATA:
[„.*,„,][Windows,.*,root,„.*,.*,„]

(read: by being executed, I might give you any user with any password with Administrator privileges on any machine, provided it runs any version of Windows)
IN DATA:
[„.*,„,][Windows,.*,„,„,]
(read: any machine, running any version of Windows)
[„.*,„,][„root,„,„,]
(read: any machine for which I have an Administrator access)

It is determined whether there is a match between the read element and an OUT DATA element (310). In some examples, a match exists if, for each field present in the read element, the field matches with the corresponding field of the scanned OUT DATA element. Continuing with the example above, the Network field of the GOAL (xxx.xxx.xxx.xxx) matches with the Network field of the OUT DATA element of the NET USER tool (.*). In the same way, the Privileges field matches (root and root), as do the Username and Password fields (respectively: <user>and .*, <pass>and .*). The OUT DATA element of NET USER indicates that the Program should be 'Windows' and that the version could be anything (.*). Because there is no corresponding field in the read element, these are not taken into account in the matching process (e.g. positive matching). This restriction about the machine having to run Windows will be propagated through the corresponding IN DATA element, which will in turn consider only machines running Windows for the NET USER tool. Consequently, and in this example, NET USER is a matching candidate. There is no other match at this level in this (voluntarily limited) example. For example, trying to match against the OUT DATA of the GETSYSTEM tool would fail, as GETSYSTEM does not output any username and thus, the match between <user> and an empty element would return false.

If there is a match, a corresponding input (IN DATA) is instantiated (312). For example, parameters in the command line of the tool and the IN DATA are instantiated. Continuing with the example above, parameter <13> will be replaced by <user> (which is the 13th element) and <14> by <pass>, building a usable command. In this example, <user> and <pass> are still template elements which are instantiated at some point, but replacing these will update all related command lines. In some example, IN DATA represents what the tool needs as input in order to work properly. Continuing with the example provided above, the NET USER tool requires two things: to run on a Windows machine (this command simply does not exist on Linux machines, another command should be used there), and to have a running shell on which to execute the command. The first requirement is represented as: [„.*,„,][Windows,.*,„,„,]. The second .*, representing the Windows version, is instantiated against the current POOL element. In the example, the current POOL element does not have any value for the program version, in which instantiation does not take place, and IN DATA remains unchanged. But for the first .*, and for the .* in the second requirement, the administrative shell, which would be represented as: [„.*,„,][„root,„,„,], the .* can be instantiated with the IP address xxx.xxx.xxx.xxx. This means that, from now on, an administrative shell is needed on IP xxx.xxx.xxx.xxx instead of on any IP. Further, the machine xxx.xxx.xxx.xxx must be running on Windows to be able to run the NET USER command on it. Continuing with the example, the instantiated IN DATA is provided as:

[„xxx.xxx.xxx.xxx,„,][Windows,.*,„,„,]
(read: machine xxx.xxx.xxx.xxx, running any version of Windows)
[„xxx.xxx.xxx.xxx,„,][„root,„,„,]

(read: machine xxx.xxx.xxx.xxx, for which I have an Administrator access)

A tree branch is generated (314). For example, a connection is provided between the GOAL, this first tool NET USER, and its two requirements (instantiated DATA IN information). In some examples, the tree does not have to be graphically depicted as a tree—the information could be stored in a database for subsequent use (e.g., as an attack tree representation, running attack tools automatically or semi-automatically, for example after prompting for initial values for the <user> and <pass> variables). Any instantiated IN DATA elements are added to POOL (316).

It is determined whether POOL is empty (318). For example, it is determined whether all elements (including instantiated elements that were added to POOL) have been read from POOL and processed as described herein. If POOL is not empty, one or more elements remain to be read, and the example process 300 loops back. Accordingly, portions of the example process 300 are recursively performed until a match cannot be found, or where the match is STARTUP INFORMATION, ultimately generating an attack tree (e.g., data that can be stored in a database and accessed to generate a graphical representation of an attack tree on a displayed (e.g., the attack tree 200 of FIGS. 2A and 2B). If POOL is empty (e.g., all elements have been reviewed), the attack tree is pruned (320). In some examples, pruning includes removing all branches which could not ultimately be bound to one or several STARTUP INFORMATION elements. Indeed, if a branch cannot be connected to STARTUP INFORMATION, it means that there is information that is required to achieve GOAL, but which cannot be obtained. In some implementations, as data is pruned, a report on the missing data elements can be provided. For example, it could be determined whether STARTUP INFORMATION was not correctly input at the outset.

Figure 4:
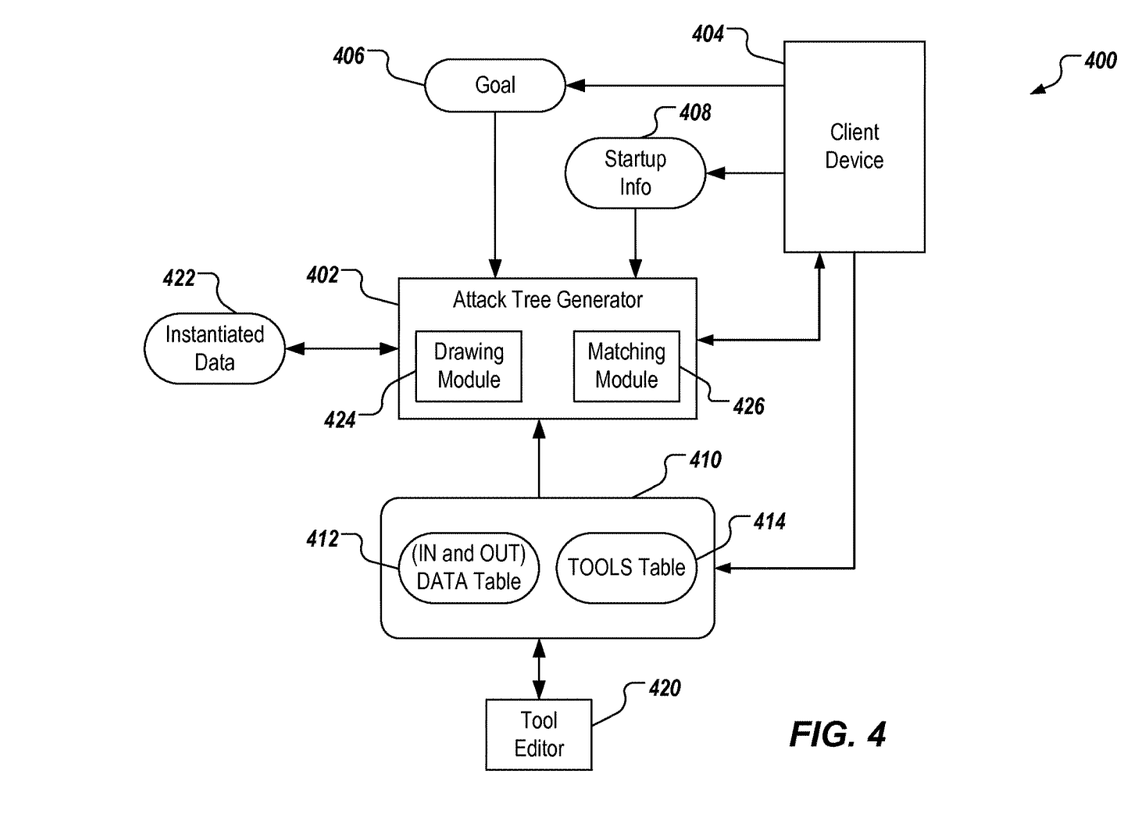
FIG. 4 depicts an example process that can be executed in accordance with implementations of the present disclosure.

FIG. 4 depicts an example architecture 400 for realizing implementations of the present disclosure. The example architecture 400 includes an attack tree generator 402 interacting with a client device 404 (e.g., the computing device 102 of FIG. 1). In some examples, the attack tree generator 402 is provided as one or more computer-executable programs that are executed by one or more computing devices (e.g., the back-end system 106 of FIG. 1). In some examples, the attack tree generator 402 receives goal data 406 and start-up information 408 from the client device 404. For example, a user of the client device 404 can input the goal data 406 and the start-up information 408, which is provided to the attack tree generator 402.

In some implementations, the attack tree generator 402 receives tool data from a register of tools 410. In some examples, the register of tools 410 includes a list of available tools (e.g., tools available for pentesting), as well as the respective input data (IN DATA) required for each tool and output data (OUT DATA) provided by each tool.

In the example of FIG. 4, the register of tools 410 includes a DATA table 412 describing the IN DATA and OUT DATA of respective tools identified in a TOOLS table 414. In some examples, the TOOLS table 414 provides a list of tools available for pentesting.

A tool editor 420 is also depicted in FIG. 4. In some examples, the tool editor 420 is provided as one or more computer-executed programs executed by one or more computers. In some examples, a user can use the tool editor 420 to create a tool that is registered in the register of tools 410. In some examples, a user can use the tool editor 420 to modify a tool registered in the register of tools 410.

In some implementations, the attack tree generator 402 processes the goal data 406, the start-up information 408, and tool data provided from the register of tools 410 to provide an attack tree based on instantiated data 422. In some implementations, the attack tree generator 402 includes a drawing module 424 and a matching module 426. In some examples, the attack tree generator 402 executes the example process 300 of FIG. 3 to provide the instantiated data 422, and to generate the attack tree (e.g., the attack tree of FIGS. 2A and 2B). For example, the matching module 426 processes received data to determine whether a data element read from POOL matches an OUT DATA element of any of the tools provided in the register of tools 410. If there is a match, the corresponding IN DATA is instantiated, as described herein, and is included in the instantiated data 422. In some examples, the drawing module 424 is used to link nodes in the attack tree (e.g., generate branches of the attack tree).

In some implementations, an attack tree generated by the example architecture 400 can be provided as a plurality of data sets (including the instantiated data 422) and respective links between data elements, which can be stored in a database. In some examples, the plurality of data sets (including the instantiated data 422) and the respective links between data elements can be processed to provide a graphical representation of an attack tree (e.g., the example attack tree 200 of FIG. 2), which can be displayed on a display (e.g., the computing device 102 of FIG. 1).

Figure 5:
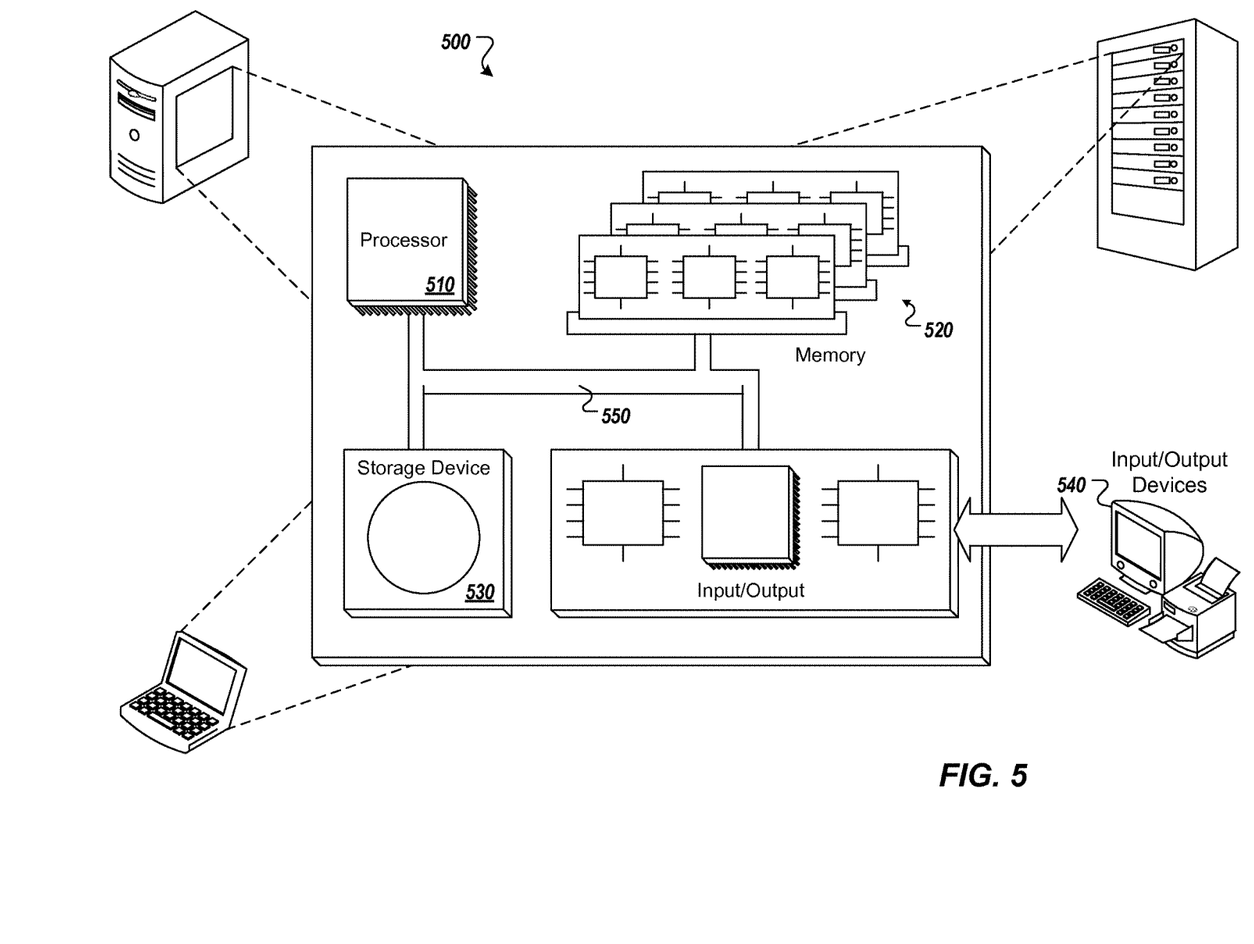
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   receiving, by the one or more processors, goal data and start-up information, the goal data indicating a goal to be achieved during a penetration test, the start-up information indicating initial data for beginning the penetration test and defining a target system;
   receiving, by the one or more processors, tool data from a register of tools, the tool data comprising one or more tools, each of the one or more tools comprising computer-executable programs configured to perform a security related function that can be used during the penetration test, and, for each tool, input data required to execute the tool and output data provided by the tool, the goal comprising obtaining administrative privileges on the target system by using a plurality of attack chains;
   processing, by the one or more processors, the goal data, the start-up information and the tool data to automatically generate an attack tree comprising attack tree data, the attack tree data comprising the goal as a root node and a plurality of data sets and links between data sets and being configured to address the plurality of attack chains;
   pruning the attack tree, by the one or more processors, by determining that a data set of the attack tree data cannot be bound to one or more elements of the start-up data, indicating that information that is required to achieve the goal during the penetration test cannot be obtained, and in response, deleting the data set from the attack tree data; and
   providing, by the one or more processors, the attack tree data to display a graphical representation of the attack tree on a display and a report on the data set that was deleted from the attack tree data comprising a determination whether the start-up data was not correctly input at the outset.

2. The method of claim 1, wherein processing the goal data, the start-up information and the tool data to automatically generate attack tree data comprises:
   reading a data element from a pool of data elements;
   comparing the data element to one or more output data of at least one tool in the register of tools; and
   selectively instantiating data based on the comparing.

3. The method of claim 2, wherein comparing the data element to one or more output data of at least one tool in the register of tools is executed in response to determining that the data element is not included in the start-up information.

4. The method of claim 2, wherein selectively instantiating data based on the comparing comprises determining that the data element matches an output data of a tool, and in response, populating one or more parameters of the tool with respective template elements to provide an executable command, the respective template elements being subsequently instantiated.

5. The method of claim 4, wherein selectively instantiating data based on the comparing further comprises adding one or more input data of the tool to the pool of data elements.

6. The method of claim 1, wherein the attack tree comprises a combination of two or more attack vectors for attacking the target system.

7. The method of claim 1, wherein at least one plurality of attack chains comprises a pivoting technique that comprises attacking one machine through one or more other machines.

8. A non-transitory computer-readable storage medium coupled to one or more processors and having instructions stored thereon which, when executed by the one or more processors, cause the one or more processors to perform operations comprising:
  receiving goal data and start-up information, the goal data indicating a goal to be achieved during a penetration test, the start-up information indicating initial data for beginning the penetration test and defining a target system, the goal comprising obtaining administrative privileges on the target system by using a plurality of attack chains;
  receiving tool data from a register of tools, the tool data comprising one or more tools, each of the one or more tools comprising computer-executable programs configured to perform a security related function that can be used during the penetration test, and, for each tool, input data required to execute the tool and output data provided by the tool;
  processing the goal data, the start-up information and the tool data to automatically generate an attack tree comprising attack tree data, the attack tree data comprising the goal as a root node and a plurality of data sets and links between data sets and being configured to address the plurality of attack chains;
  pruning the attack tree, by the one or more processors, by determining that a data set of the attack tree data cannot be bound to one or more elements of the start-up data, indicating that information that is required to achieve the goal during the penetration test cannot be obtained, and in response, deleting the data set from the attack tree data; and
  providing the attack tree data to display a graphical representation of the attack tree on a display and a report on the data set that was deleted from the attack tree data comprising a determination whether the start-up data was not correctly input at the outset.

9. The computer-readable storage medium of claim 8, wherein processing the goal data, the start-up information and the tool data to automatically generate attack tree data comprises:
  reading a data element from a pool of data elements;
  comparing the data element to one or more output data of at least one tool in the register of tools; and
  selectively instantiating data based on the comparing.

10. The computer-readable storage medium of claim 9, wherein comparing the data element to one or more output data of at least one tool in the register of tools is executed in response to determining that the data element is not included in the start-up information.

11. The computer-readable storage medium of claim 9, wherein selectively instantiating data based on the comparing comprises determining that the data element matches an output data of a tool, and in response, populating one or more parameters of the tool with respective template elements to provide an executable command, the respective template elements being subsequently instantiated.

12. The computer-readable storage medium of claim 11, wherein selectively instantiating data based on the comparing further comprises adding one or more input data of the tool to the pool of data elements.

13. The computer-readable storage medium of claim 8, wherein the attack tree comprises a combination of two or more attack vectors for attacking the target system.

14. The computer-readable storage medium of claim 8, wherein at least one plurality of attack chains comprises a pivoting technique that comprises attacking one machine through one or more other machines.

15. A system, comprising:
  a computing device; and
  a computer-readable storage device coupled to the computing device and having instructions stored thereon which, when executed by the computing device, cause the computing device to perform operations comprising:
  receiving goal data and start-up information, the goal data indicating a goal to be achieved during a penetration test, the start-up information indicating initial data for beginning the penetration test and defining a target system, the goal comprising obtaining administrative privileges on the target system by using a plurality of attack chains;
  receiving tool data from a register of tools, the tool data comprising one or more tools, each of the one or more tools comprising computer-executable programs configured to perform a security related function that can be used during the penetration test, and, for each tool, input data required to execute the tool and output data provided by the tool;
  processing the goal data, the start-up information and the tool data to automatically generate an attack tree comprising attack tree data, the attack tree data comprising the goal as a root node and a plurality of data sets and links between data sets and being configured to address the plurality of attack chains;
  pruning the attack tree, by the one or more processors, by determining that a data set of the attack tree data cannot be bound to one or more elements of the start-up data, indicating that information that is required to achieve the goal during the penetration test cannot be obtained, and in response, deleting the data set from the attack tree data; and
  providing the attack tree data to display a graphical representation of the attack tree on a display and a report on the data set that was deleted from the attack tree data comprising a determination whether the start-up data was not correctly input at the outset.

16. The system of claim 15, wherein processing the goal data, the start-up information and the tool data to automatically generate attack tree data comprises:
  reading a data element from a pool of data elements;
  comparing the data element to one or more output data of at least one tool in the register of tools; and
  selectively instantiating data based on the comparing.

17. The system of claim 16, wherein comparing the data element to one or more output data of at least one tool in the register of tools is executed in response to determining that the data element is not included in the start-up information.

18. The system of claim 16, wherein selectively instantiating data based on the comparing comprises determining that the data element matches an output data of a tool, and in response, populating one or more parameters of the tool with respective template elements to provide an executable command, the respective template elements being subsequently instantiated.

19. The system of claim 18, wherein selectively instantiating data based on the comparing further comprises adding one or more input data of the tool to the pool of data elements.

20. The system of claim 15, wherein the attack tree comprises a combination of two or more attack vectors for attacking the target system.

* * * * *